United States Patent
Kim et al.

(10) Patent No.: US 11,699,797 B2
(45) Date of Patent: Jul. 11, 2023

(54) MEMBRANE HUMIDIFIER FOR FUEL CELL

(71) Applicant: KOLON INDUSTRIES, INC., Seoul (KR)

(72) Inventors: Do-Woo Kim, Seoul (KR); Kyoung-Ju Kim, Seoul (KR); In-Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 81 days.

(21) Appl. No.: 17/055,168

(22) PCT Filed: Jun. 29, 2018

(86) PCT No.: PCT/KR2018/007436
§ 371 (c)(1),
(2) Date: Nov. 13, 2020

(87) PCT Pub. No.: WO2019/235683
PCT Pub. Date: Dec. 12, 2019

(65) Prior Publication Data
US 2021/0226233 A1 Jul. 22, 2021

(30) Foreign Application Priority Data
Jun. 5, 2018 (KR) .................... 10-2018-0065092

(51) Int. Cl.
*H01M 8/04119* (2016.01)
*H01M 50/489* (2021.01)
(Continued)

(52) U.S. Cl.
CPC ...... *H01M 8/04149* (2013.01); *B01D 63/022* (2013.01); *H01M 50/44* (2021.01); *H01M 50/489* (2021.01)

(58) Field of Classification Search
CPC ............ H01M 8/04149; H01M 50/44; H01M 50/489; H01M 8/04291; B01D 63/022;
(Continued)

(56) References Cited

U.S. PATENT DOCUMENTS

2014/0291874 A1* 10/2014 Kim .................... F24F 6/04
261/101

FOREIGN PATENT DOCUMENTS

DE 102015001866 A1 6/2016
JP H08243158 A 9/1996
(Continued)

OTHER PUBLICATIONS

Machine translation of JP 2004-154725A, Morita Toru, 2004 (Year: 2004).*

(Continued)

*Primary Examiner* — Kwang Han
(74) *Attorney, Agent, or Firm* — Harvest IP Law, LLP

(57) ABSTRACT

A membrane humidifier for a fuel cell, of the present invention, comprises: a middle case in which a plurality of hollow fiber membranes are accommodated; a cap case coupled to the middle case; potting parts formed at the ends of the plurality of hollow fiber membranes; an assembly member disposed between the cap case and the end of the middle case so as to provide air tight coupling therebetween; and a protrusion part extending toward the edges of the potting parts from the inside of the cap case so as to provide air tight coupling between the cap case and the potting parts.

6 Claims, 10 Drawing Sheets

(51) Int. Cl.
*H01M 50/44* (2021.01)
*B01D 63/02* (2006.01)

(58) Field of Classification Search
CPC ..... B01D 2313/21; B01D 63/02; Y02E 60/10; Y02E 60/50
See application file for complete search history.

(56) References Cited

FOREIGN PATENT DOCUMENTS

| | | | | | |
|---|---|---|---|---|---|
| JP | 2004-154725 A | * | 6/2004 | ............. | B01D 53/22 |
| JP | 2004154725 A | | 6/2004 | | |
| JP | 2005265196 A | | 9/2005 | | |
| JP | 2006087661 A | | 4/2006 | | |
| JP | 2009-022923 A | | 2/2009 | | |
| JP | 4939280 B2 | | 5/2012 | | |
| JP | 2014522556 A | | 9/2014 | | |
| JP | 2015522417 A | | 8/2015 | | |
| JP | 2017-070934 A | | 4/2017 | | |
| JP | 2018051483 A | | 4/2018 | | |
| KR | 2014-0038223 A | * | 3/2014 | ............... | F24F 3/14 |
| KR | 10-1396040 B1 | | 5/2014 | | |
| KR | 10-2014-0117346 A | | 10/2014 | | |
| KR | 10-1535026 B1 | | 7/2015 | | |
| WO | 2015046430 A1 | | 4/2015 | | |

OTHER PUBLICATIONS

Machine translation of KR 2014-0038223A, Lee et al. (Year: 2014).*
International Search Report dated Apr. 23, 2019.
EP search Report dated Feb. 1, 2022.
Counterpart Japanese office action dated Dec. 28, 2021.

* cited by examiner

MEMBRANE HUMIDIFIER FOR FUEL CELL

CROSS REFERENCE TO RELATED APPLICATIONS

This application is a National Stage of International Application No. PCT/KR2018/007436 filed Jun. 29, 2019, claiming priority based on Korean Patent Application No. 10-2018-0065092 filed Jun. 5, 2018.

TECHNICAL FIELD

The present disclosure relates to a membrane humidifier for a fuel cell, and more particularly to a membrane humidifier for a fuel cell capable of performing a hermetic sealing function in high-temperature/high-pressure/high-humidity environments through a mechanical assembly structure.

BACKGROUND ART

A fuel cell is a power generation cell that combines hydrogen and oxygen to generate electricity. Such a fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors that improve the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, in the case in which the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a humidification membrane method of supplying moisture to a gas fluid bed using a polymer separation membrane are used as methods of humidifying the polymer electrolyte membrane or the proton exchange membrane.

Among these methods, the humidification membrane method, which provides water vapor to a gas that is supplied to the polymer electrolyte membrane or the proton exchange membrane using a membrane configured to selectively transmit only water vapor included in an exhaust gas in order to humidify the polymer electrolyte membrane or the proton exchange membrane, is advantageous in that it is possible to reduce the weight and size of a humidifier.

In the case in which a module is formed, a hollow fiber membrane having large transmission area per unit volume is preferably used as the selective transmission membrane used in the humidification membrane method. That is, in the case in which a membrane humidifier is manufactured using a hollow fiber membrane, high integration of the hollow fiber membrane having large contact surface area is possible, whereby it is possible to sufficiently humidify a fuel cell even in the case of a small capacity, it is possible to use a low-priced material, and it is possible to collect moisture and heat included in a non-reaction gas discharged from the fuel cell at a high temperature and to reuse the collected moisture and heat through the humidifier.

Meanwhile, in a general membrane humidifier for a fuel cell, hollow fiber membranes are accommodated in a housing unit, and the hollow fiber membranes are adhered to the inner wall of the housing unit by a potting unit. The number of hollow fiber membranes accommodated in the housing unit is determined based on a desired output value of a stack, and the hollow fiber membranes are adhered and fixed to the housing unit by the potting unit. High-temperature air from a blower and high-temperature, high-humidity air from the stack are introduced into the membrane humidifier for a fuel cell. The coefficient of thermal expansion and the coefficient of thermal shrinkage of the potting unit are high, whereby a gap is formed between the housing unit and the potting unit and air leaks therethrough. In order to prevent this, a sealant is coated in the gap between the housing unit and the potting unit.

In the case in which air leaks, the air introduced from the blower leaks from the membrane humidifier for a fuel cell, whereby the amount of air that is introduced into the stack is reduced. For this reason, it is necessary for the blower to supply a larger amount of air than the amount of air actually necessary for the stack, whereby the power consumption of the blower is increased, which leads to system power loss. Consequently, maximum leakage prevention is advantageous in terms of overall power efficiency.

DISCLOSURE

Technical Problem

It is an object of the present disclosure to provide a membrane humidifier for a fuel cell capable of performing a hermetic sealing function in high-temperature/high-pressure/high-humidity environments through a mechanical assembly structure.

Technical Solution

A membrane humidifier for a fuel cell according to the present disclosure includes a middle case accommodating a plurality of hollow fiber membranes, a cap case coupled to the middle case, a potting unit formed at ends of the plurality of hollow fiber membranes, an assembly member disposed between the cap case and an end of the middle case, the assembly member being configured to perform hermetic coupling therebetween, and a projection portion extending from the inside of the cap case toward the edge of the potting unit, the projection portion being configured to perform hermetic coupling between the cap case and the potting unit.

The cap case may include a large-diameter portion coupled to the middle case, the large-diameter portion having an inner diameter greater than the outer diameter of the potting unit, and a small-diameter portion protruding from a surface of the large-diameter portion, the small-diameter portion having an inner diameter less than the outer diameter of the potting unit.

The assembly member may include a main body disposed between the cap case and the end of the middle case, a first leg portion extending from the outer end of the main body in a longitudinal direction of the hollow fiber membranes so as to be in contact with the outer side surface of the end of the middle case, and a second leg portion extending from the inner end of the main body in the longitudinal direction of the hollow fiber membranes so as to be in contact with the inner side surface of the end of the middle case.

The assembly member may further include a filling portion filling an area between the projection portion of the cap case and the second leg portion.

The projection portion of the cap case may be formed so as to be in contact with the second leg portion.

The outer side surface of the end of the middle case may be provided with a step portion configured to receive the first leg portion.

The cap case may include a protrusion protruding from the surface thereof opposite the end of the middle case.

The projection portion may include an inclined surface formed at the inner side surface thereof, and the potting unit may include an inclined surface formed at the outer side surface thereof so as to press against the inclined surface of the projection portion.

The assembly member may further include a filling portion filling an area between the projection portion of the cap case and the second leg portion.

The projection portion of the cap case may be formed so as to be in contact with the second leg portion.

The outer side surface of the end of the middle case may be provided with a step portion configured to receive the first leg portion.

The cap case may include a protrusion protruding from the surface thereof opposite the end of the middle case.

Advantageous Effects

A membrane humidifier for a fuel cell according to the present disclosure is capable of performing a hermetic sealing function in high-temperature/high-pressure/high-humidity environments through a mechanical assembly structure.

In addition, a mechanical sealing method is used instead of a chemical sealing method, whereby it is possible to omit a polyurethane/sealant coating and curing process necessary for a conventional chemical sealing method, and therefore it is possible to shorten working time, to improve work efficiency, and to construct a mass production system.

In addition, when unit cartridges disposed in the membrane humidifier are defective, reworkability is excellent, whereby it is possible to reduce a part scrap rate.

In addition, the membrane humidifier may be disassembled, only defective cartridges may be replaced, and then the membrane humidifier may be reassembled, whereby the present disclosure is advantageous in terms of reworkability and reuse of parts.

Furthermore, it is possible to simultaneously perform hermetic coupling between two or more parts through assembly members and projecting portions of cap cases, whereby manufacture and assembly are very convenient and efficient.

BEST MODE

The present disclosure may be changed in various manners and may have various embodiments, wherein specific embodiments will be illustrated and described in detail in the following detailed description. However, the present disclosure is not limited to the specific embodiments, and it should be understood that the present disclosure includes all modifications, equivalents, or substitutions included in the idea and technical scope of the present disclosure.

The terms used in the present disclosure are provided only to describe the specific embodiments, and do not limit the present disclosure. Singular forms are intended to include plural forms as well, unless the context clearly indicates otherwise. In the present disclosure, it should be understood that the terms "includes," "has," etc. specify the presence of features, numbers, steps, operations, elements, components, or combinations thereof described in the specification, but do not preclude the presence or addition of one or more other features, numbers, steps, operations, elements, components, or combinations thereof. Hereinafter, a membrane humidifier for a fuel cell according to an embodiment of the present disclosure will be described with reference to the accompanying drawings.

Figure 1:
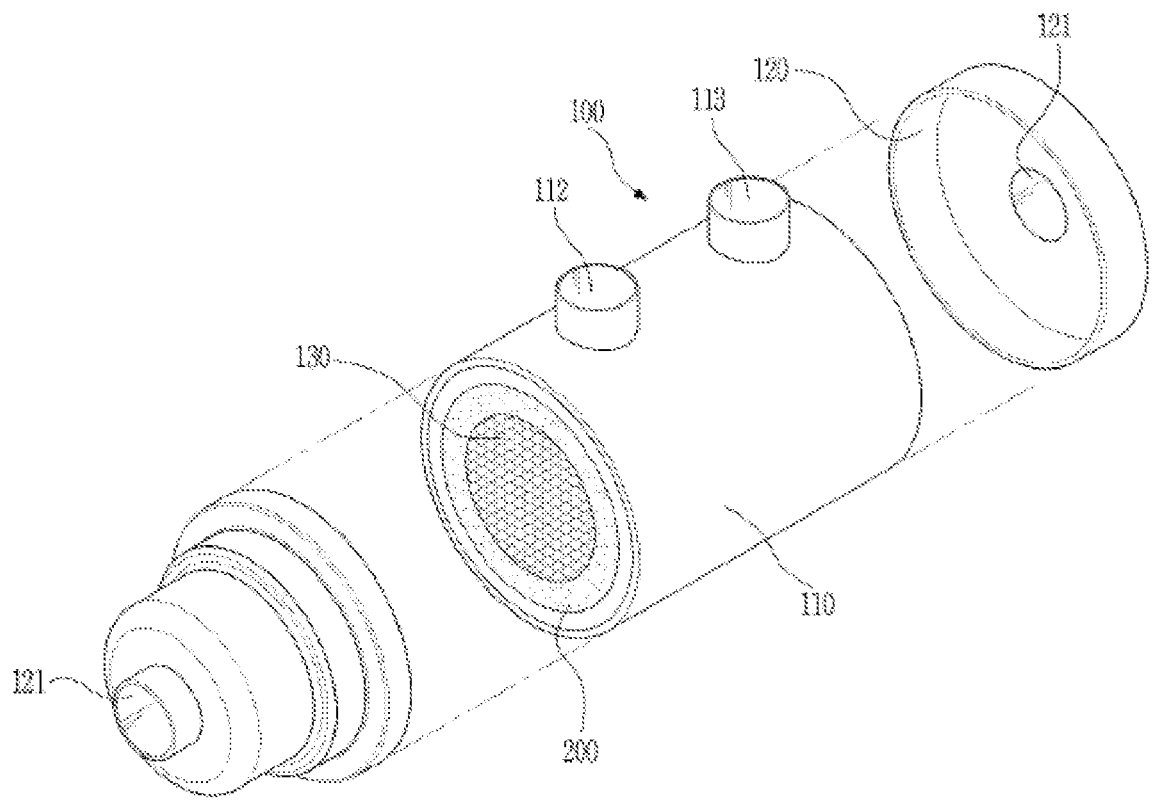
FIGS. 1 and 2 are exploded perspective views showing a membrane humidifier for a fuel cell according to an embodiment of the present disclosure.
Figure 2:
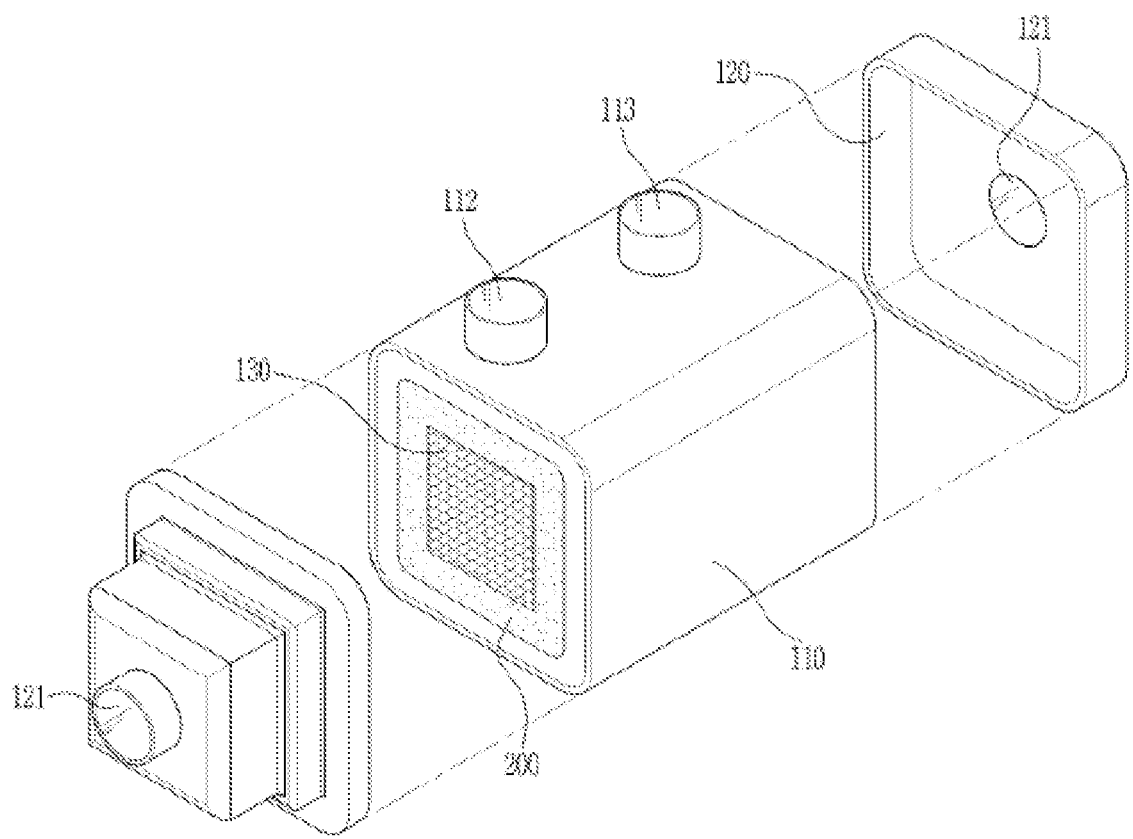

FIGS. 1 and 2 are exploded perspective views showing a membrane humidifier for a fuel cell according to an embodiment of the present disclosure. As shown in FIGS. 1 and 2, the membrane humidifier for a fuel cell according to the embodiment of the present disclosure includes a middle case 110, cap cases 120, potting units 130, and assembly members 200.

The middle case 110 is coupled to the cap cases 120 to define the external appearance of the membrane humidifier. Each of the middle case 110 and the cap cases 120 may be made of hard plastic, such as polycarbonate, or metal. The lateral sectional shape of each of the middle case 110 and the cap cases 120 may be a circle, as shown in FIG. 1, or the lateral sectional shape thereof may be a polygon, as shown in FIG. 2. The polygon may be a rectangle, a square, a trapezoid, a parallelogram, a pentagon, or a hexagon, and corners of the polygon may be round. In addition, the circle may be an oval. The middle case 110 is provided with a second fluid inlet 112, through which a second fluid is introduced, and a second fluid outlet 113, through which the second fluid is discharged. Alternatively, reference numeral 113 may indicate the second fluid inlet, and reference numeral 112 may indicate the second fluid outlet.

A hollow fiber membrane module, in which a plurality of hollow fiber membranes is accommodated, is disposed in the middle case 110. The hollow fiber membrane module may include a hollow fiber membrane bundle comprising a plurality of integrated hollow fiber membranes or a plurality of hollow fiber membrane cartridges 140 (see FIG. 3), in each of which hollow fiber membranes are accommodated. The drawings illustrate the case in which the hollow fiber membrane module includes hollow fiber membrane cartridges 140; however, the case in which the hollow fiber membrane module includes a hollow fiber membrane bundle is not excluded.

The cap cases 120 are coupled to opposite ends of the middle case 110. The cap cases 120 are provided with fluid introduction and discharge ports 121, one of which is a first fluid inlet and the other of which is a first fluid outlet. A first fluid introduced through the fluid introduction and discharge port 121 of one of the cap cases 120 passes through an inner pipeline of each of the hollow fiber membranes accommodated in each of the hollow fiber membrane cartridges 140 and is then discharged outside through the fluid introduction and discharge port 121 of the other cap case 120. Each hollow fiber membrane may be a hollow fiber membrane made of, for example, Nafion, polyetherimide, polyimide (PI), polyphenylsulfone, polysulfone (PS), or polyethersulfone (PES).

In the case in which the hollow fiber membrane module includes a plurality of hollow fiber membrane cartridges 140, the hollow fiber membrane cartridges 140 may be provided at one side thereof with a first mesh unit 142 configured to allow the second fluid introduced into the membrane humidifier through the second fluid inlet 112 to be introduced into the hollow fiber membrane cartridges 140 therethrough, and may be provided at the other side thereof with a second mesh unit (not shown) configured to allow the second fluid that has performed moisture exchange in the hollow fiber membrane cartridges 140 to be discharged from the hollow fiber membrane cartridges 140 therethrough.

The hollow fiber membrane bundle or the hollow fiber membrane cartridges 140 are provided at opposite ends thereof with potting units 130 configured to bind the hollow fiber membranes and to fill the gaps between the hollow fiber membranes. As a result, the opposite ends of the hollow fiber membrane module are blocked by the potting units 130, whereby a flow channel configured to allow the second fluid to pass therethrough is defined in the hollow fiber membrane module. Each of the potting units 130 is made of a known material, and a detailed description thereof will be omitted from this specification.

Figure 3:
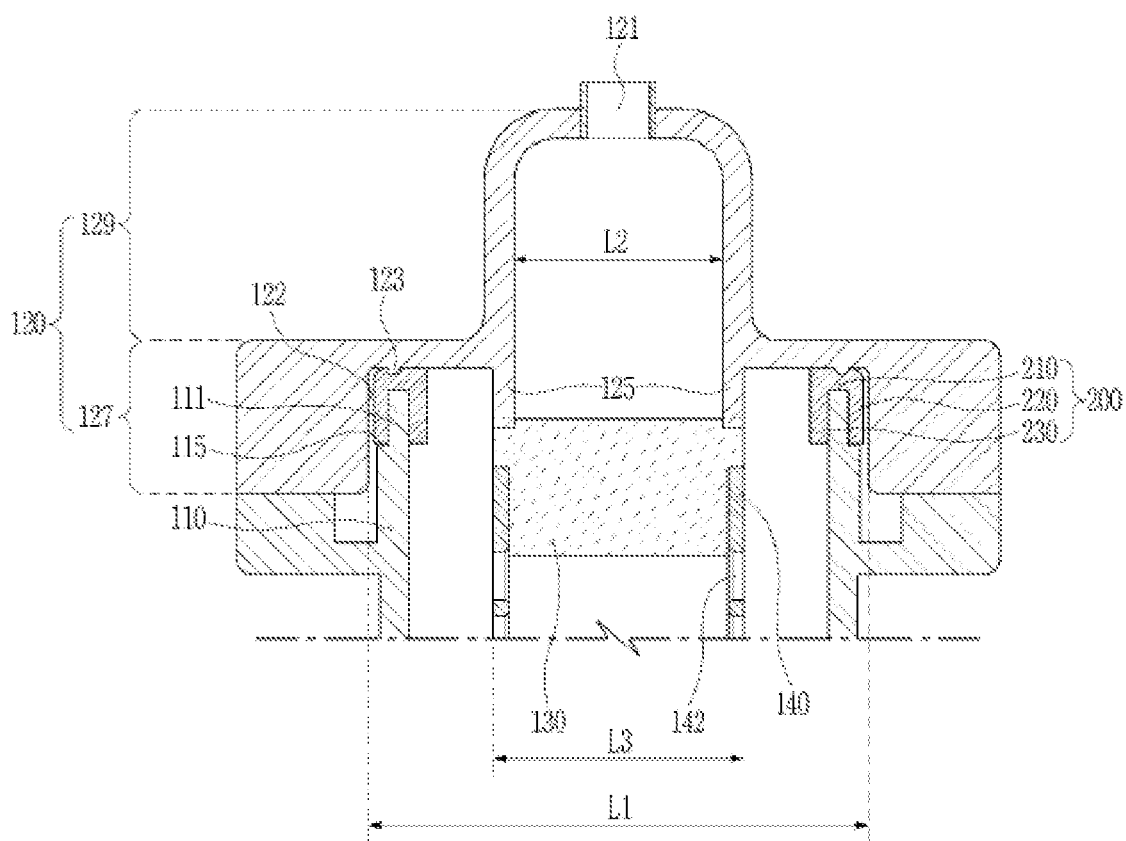
FIG. 3 is a sectional view showing a membrane humidifier according to a first embodiment of the present disclosure.
Figure 4:
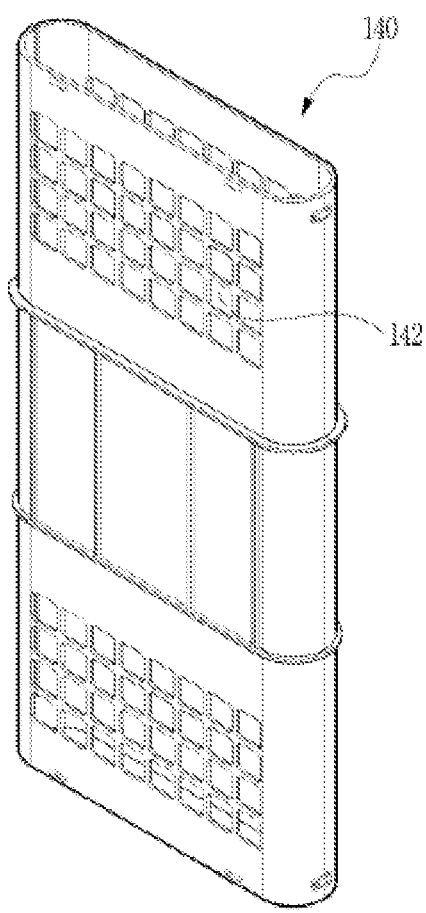
FIG. 4 is a perspective view showing a hollow fiber membrane cartridge according to an embodiment of the present disclosure.
Figure 5A:
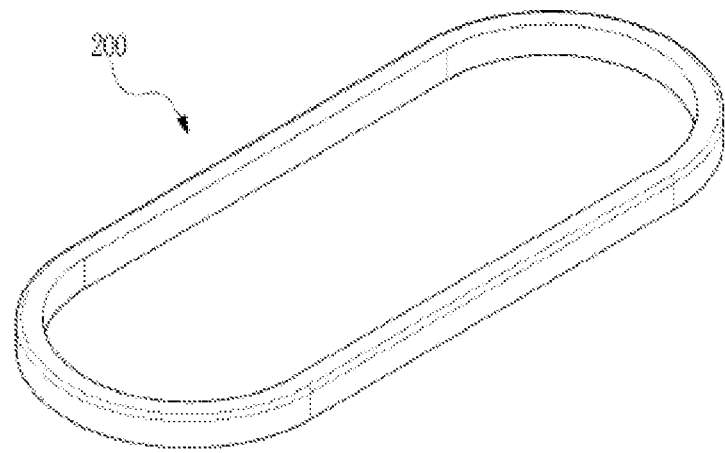
FIG. 5 is a perspective view showing an assembly member according to an embodiment of the present disclosure.
Figure 5B:
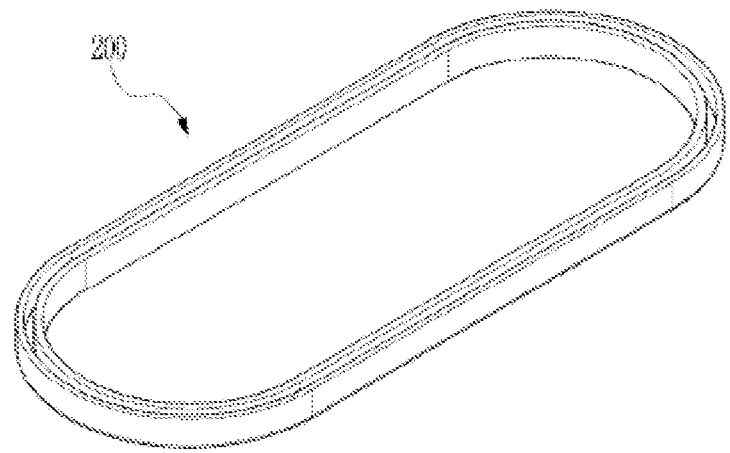

FIG. 3 is a sectional view showing a membrane humidifier according to a first embodiment of the present disclosure, FIG. 4 is a perspective view showing a hollow fiber membrane cartridge according to an embodiment of the present disclosure, and FIG. 5 is a perspective view showing an assembly member according to an embodiment of the present disclosure.

Hereinafter, embodiments in which a hollow fiber membrane module includes a hollow fiber membrane cartridge 140 will be shown and described. In addition, only a single hollow fiber membrane cartridge 140 is shown in the drawings; however, the case in which a plurality of hollow fiber membrane cartridges 140 is included in the membrane humidifier is not excluded.

The hollow fiber membrane cartridge 140 of FIG. 4 is one of a plurality of cartridges disposed in the case of the membrane humidifier. FIG. 5 shows an assembly member in the case in which a single cartridge and potting units are provided, wherein the shown assembly member 200 is generally configured so as to have a structure in which a pair of linear portions opposite each other is connected to a pair of semicircular portions opposite each other. FIG. 5(*a*) is a perspective view when viewed from the side at which the assembly member contacts a corresponding one of the cap cases 120, and FIG. 5(*b*) is a perspective view when viewed from the opposite side.

The inner surface of the cap case 120 is assembled so as to be spaced apart from the end 111 of the middle case 110 by the assembly member 200. In addition, the inner surface of the cap case 120 is assembled so as to be spaced apart also from the potting unit 130.

In addition, the outer surfaces of the potting unit 130 and cartridge 140 are spaced apart from the inner surface of the middle case 110. Consequently, the second fluid flows to the space between the potting unit 130 and the middle case 110.

The middle case 110 and the cap case 120 are assembled using various fastening methods (not shown), such as fastening using a plurality of bolts, pressing, welding, and clamping. At this time, assembly is performed such that the assembly member 200 is inserted into the gap between the middle case and the cap case and is then pressed. FIG. 3 and the following figures are sectional views taken along planes that do not pass through fastening units, such as bolts, and therefore fastening units, such as bolts, are not shown.

As previously described, each of the middle case 110 and the cap case 120 may have a polygonal or circular section. The sectional views of FIG. 3 and the following figures show the case in which each of the middle case 110 and the cap case 120 has a quadrangular section.

The cap case 120 may include a large-diameter portion 127 coupled to the middle case 110, the large-diameter portion having an inner diameter L1 greater than the outer diameter L3 of the potting unit 130, and a small-diameter portion 129 protruding from a surface of the large-diameter portion 127, the small-diameter portion having an inner diameter L2 less than the outer diameter L3 of the potting unit 130.

Here, the outer diameter, the inner diameter, the large-diameter portion, and the small-diameter portion are generally terms related to the diameter of a circular pipe; however, the cases in which a housing of the membrane humidifier is circular, oval, and polygonal are all included.

Particularly, in the case in which the housing of the membrane humidifier is polygonal, the distance L2 between opposite inner surfaces of the small-diameter portion 129 of the cap case 120, in which the fluid introduction and discharge port 121 is formed, is less than the distance L3 between opposite outer surfaces of the potting unit 130. Consequently, the potting unit 130 may be pressed and fixed in the longitudinal direction by a projecting portion 125, a description of which will follow. The shape of the cap case 120 may be applied to all of the following embodiments as well as the first embodiment without change.

In addition, the distance L3 between opposite outer surfaces of the potting unit 130 is less than the distance between opposite inner surfaces of the middle case 110, whereby the potting unit 130 is disposed in the middle case 110 so as to be spaced apart therefrom. Consequently, the assembly member 200 is disposed between the middle case 110 and the potting unit 130 to fix the potting unit 130 such that the potting unit cannot move relative to the middle case 110.

The assembly member 200 is disposed between the cap case 120 and the end of the middle case 110, and is assembled so as to perform hermetic coupling therebetween. The cap case 120 includes a projecting portion 125 extending from the inside thereof toward the edge of the potting unit 130 so as to perform hermetic coupling between the cap case 120 and the potting unit 130.

The assembly member 200 includes a main body 210 disposed between the cap case 120 and the end of the middle case 110, a first leg portion 220 extending from the outer end of the main body 210 in the longitudinal direction of the hollow fiber membranes so as to be in contact with the outer side surface of the end 111 of the middle case 110, and a second leg portion 230 extending from the inner end of the main body 210 in the longitudinal direction of the hollow fiber membranes so as to be in contact with the inner side surface of the end of the middle case 110.

A pair of assembly members 200 is shown as being disposed in a horizontally symmetrical fashion in the sectional view of FIG. 3; however, it will be understood that, in actuality, a single assembly member 200 is generally formed so as to have a quadrangular ring shape.

The main body 210 is disposed so as to be pressed by the inner surface of the cap case 120 and the end 111 of the middle case 110.

The first leg portion 220 extends from the outer end of the main body 210 downwards, i.e. in the longitudinal direction of the hollow fiber membranes, based on FIG. 3, and is disposed so as to be in contact with the outer side surface of the end 111 of the middle case 110.

The second leg portion 230 extends from the inner end of the main body 210 downwards, i.e. in the longitudinal direction of the hollow fiber membranes, and is disposed so as to be in contact with the inner side surface of the end 111 of the middle case 110.

As a result, a recess, into which the end of the middle case 110 is inserted, may be formed between the first leg portion 220 and the second leg portion 230.

In addition, although the outer surface of the first leg portion 220 may be in contact with the inner surface of the cap case 120, it is also possible that, as illustrated, they are not in contact with each other.

A step portion 115 configured to receive the first leg portion 220 may be provided at the outer side surface of the end 111 of the middle case 110. As a result, the outer surface of the middle case 110 and the outer surface of the first leg portion 220 may form almost the same plane.

The projecting portion 125 extends from the inside of the cap case 120 toward the potting unit 130, i.e. in the longitudinal direction of the hollow fiber membranes, and is formed so as to press against the edge of the potting unit 130. The projecting portion 125 may extend by a length greater than the distance between the inner surface of the cap case 120 and a side surface of the potting unit 130. In general, the potting unit 130 is made of a softer material than the cap case 120. At the time of assembly, therefor, the potting unit 130 presses the cap case 120 such that the cap case is shrunk.

In FIG. 3, the shape of the potting unit 130 before the edge of the potting unit is pressed by the projection portion 125 is shown in dotted lines. That is, when the potting unit 130 is pressed by the projection portion 125, the edge of the potting unit 130 is shrunk by a predetermined depth by the projection portion 125, whereby hermetic coupling therebetween is achieved.

In the sectional view of FIG. 3, the projection portion 125 is shown as being constituted by two members. In actuality, however, the projection portion 125 is formed integrally with the cap case 120, and is formed so as to have the shape of a polygonal or circular rib. The outer surface of the projection portion 125 may be formed so as to have the same plane as the outer surfaces of the potting unit 130 and hollow fiber membrane cartridge 140.

Preferably, the cap case 120 includes a protrusion 123 protruding from the surface thereof that is opposite the end 111 of the middle case 110. The protrusion 123 may be formed in the shape of a rib having a semicircular section or any of various other shapes. In particular, the protrusion 123 serves to further press the main body 210 of the assembly member 200, thereby improving hermetic sealing, and to fix the main body 210 such that the main body cannot move when pressed.

In the membrane humidifier according to the first embodiment of the present disclosure, the assembly member 200 may perform hermetic coupling between the end of the middle case and the cap case 120, and at the same time the projection portion 125 of the cap case 120 may perform hermetic coupling between the cap case 120 and the potting unit 130.

Figure 6:
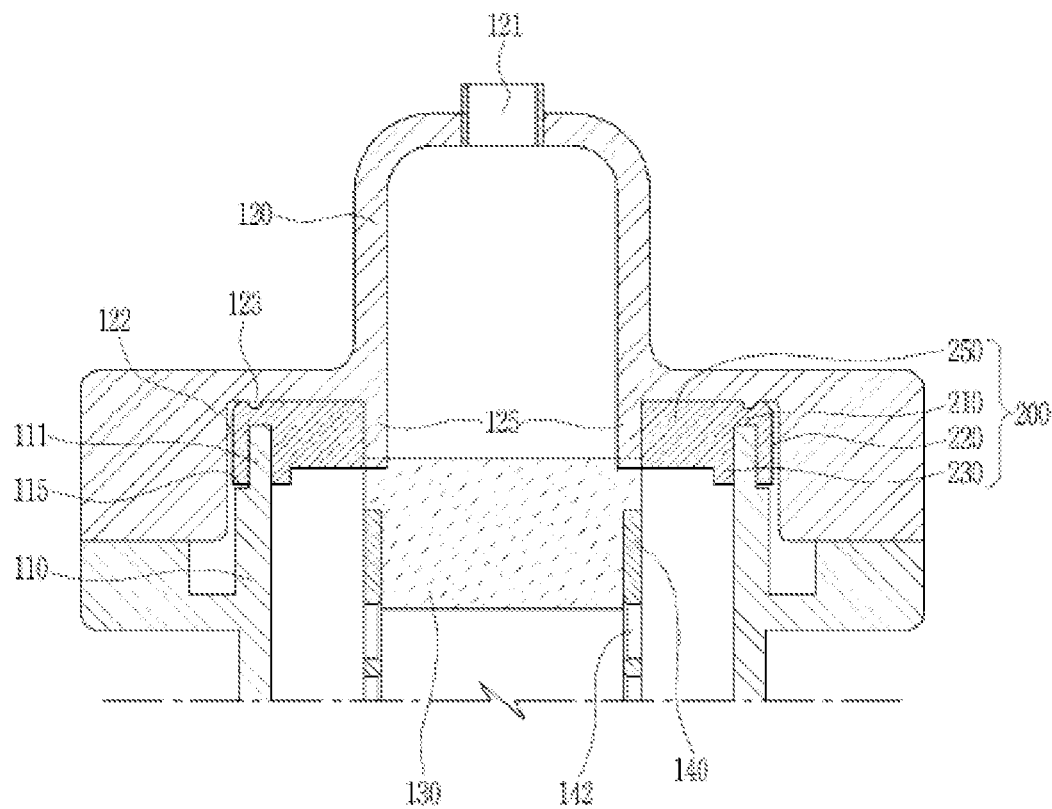
FIG. 6 is a sectional view showing a membrane humidifier according to a second embodiment of the present disclosure.

FIG. 6 is a sectional view showing a membrane humidifier according to a second embodiment of the present disclosure. The membrane humidifier according to the second embodiment is different from the membrane humidifier according to the first embodiment in that the assembly member 200 further includes a filling portion 250 filling the area between the projection portion 125 of the cap case 120 and the second leg portion 230.

As previously described, in the embodiments shown in FIGS. 3 to 10, a plurality of hollow fiber membranes are accommodated in a cartridge 140, and the cartridge or a plurality of cartridges is/are disposed in the middle case 110.

Since the inner surface of the cap case 120 and the potting unit 130 are disposed so as to be spaced apart from each other, as described above, the filling portion 250 is formed so as to fill the area between the projecting portion 125 of the cap case 120 and the second leg portion 230. Consequently, it is possible to further prevent the second fluid introduced into the space between the inner surface of the cap case 120 and the cartridge 140 from leaking to the fluid introduction and discharge port 121 without passing through the hollow fiber membranes.

The vertical length of the filling portion 250 may be formed so as to be equal to the length of the projecting portion 125, or may be formed so as to be equal to the length of the second leg portion 230, as shown in FIG. 3. Also, in FIG. 3, the length of each of the first leg portion 220 and the second leg portion 230 is formed so as to be greater than the length of the projecting portion 125. The length of each of the first leg portion 220 and the second leg portion 230 may be formed so as to be equal to the length of the projecting portion 125. In this case, the vertical length of the filling portion 250 may be formed so as to be equal to the length of each of the second leg portion 230 and the projecting portion 125.

The assembly member 200 is made of a soft material that has lower hardness than the cap case 120. The width of the filling portion 250 may be formed so as to be slightly greater than the width between the inner surface of the second leg portion 230 and the outer surface of the projecting portion 125, such that the filling portion can be shrunk by pressing at the time of assembly.

Figure 7:
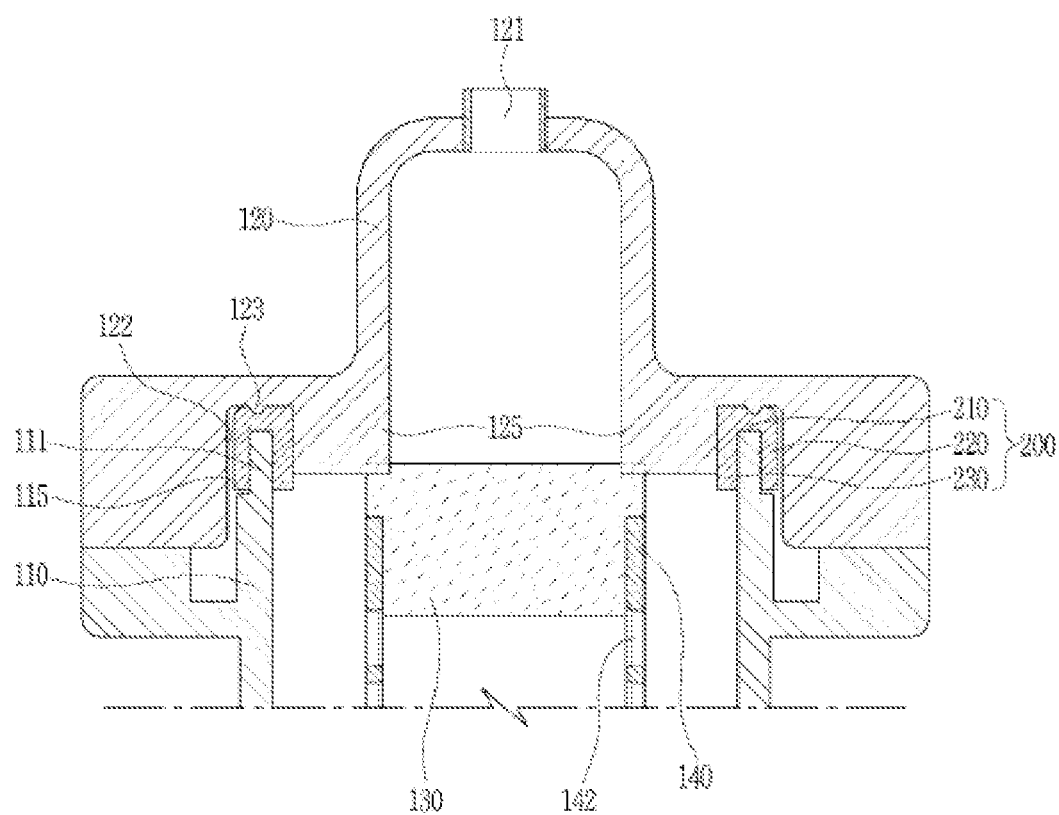
FIG. 7 is a sectional view showing a membrane humidifier according to a third embodiment of the present disclosure.

FIG. 7 is a sectional view showing a membrane humidifier according to a third embodiment of the present disclosure. The membrane humidifier according to the third embodiment is different from the membrane humidifier according to the first embodiment in that the projection portion 125 of the cap case 120 is formed so as to be in contact with the second leg portion 230.

In the first embodiment, the outer surface of the projection portion 125 is formed so as to have the same plane as the outer surface of the potting unit 130. In the third embodiment, however, the projection portion 125 is formed so as to have an increased thickness in the leftward-rightward direction such that the outer surface of the projection portion is in contact with the inner surface of the second leg portion 230 of the assembly member 200.

As a result, the space between the inner surface of the projection portion 125 and the end 111 of the middle case 110 may be completely filled with the projection portion 125 and the assembly member 200. Consequently, it is possible to further prevent the second fluid introduced into the space between the inner surface of the cap case 120 and the cartridge 140 from leaking to the fluid introduction and discharge port 121 without passing through the hollow fiber membranes.

The vertical length of the projection portion 125 is formed so as to be less than the vertical length of the assembly member 200. Alternatively, the projection portion may be formed so as to have the same length as the assembly member 200.

In addition, the protrusion 123 formed on the inner surface of the cap case 120 presses the main body 210, whereby the main body 210 may securely perform hermetic coupling between the cap case 120 and the end 111 of the middle case 110.

Figure 8:
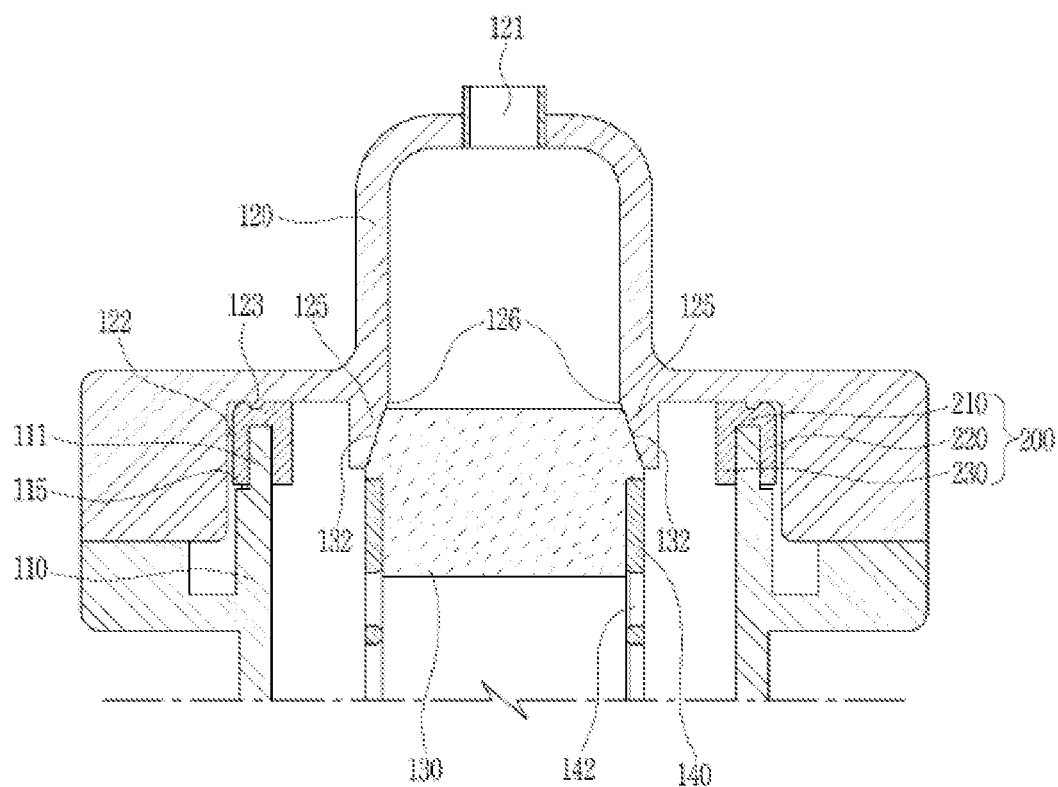
FIG. 8 is a sectional view showing a membrane humidifier according to a fourth embodiment of the present disclosure.

FIG. 8 is a sectional view showing a membrane humidifier according to a fourth embodiment of the present disclosure. The membrane humidifier according to the fourth embodiment is different from the membrane humidifier according to the first embodiment in that an inclined surface 126 is formed at the inner side surface of the projection portion 125 and an inclined surface 132 is formed at the outer side surface of the potting unit 130 so as to press against the inclined surface 126 of the projection portion 125.

The inclined surface 126 is formed at the inner side surface of the projection portion 125, and the inclined surface 132 is formed at the edge of the upper end of the potting unit 130. At the time of assembly, the inclined surface 132 of the potting unit 130 is inserted inside the inclined surface 126 of the projection portion 125 while pressing against it, whereby the airtightness between the cap case 120 and the potting unit 130 may be improved.

Since the hardness of the cap case 120 is generally higher than the hardness of the potting unit 130. As such, at the time of assembly, the inclined surface 126 of the projection portion 125 is pressed against the inclined surface 132 of the potting unit 130 such that the potting unit 130 shrinks.

Since the inclined surface of the projection portion 125 of the cap case 120 and the inclined surface of the potting unit 130 are pressed against each other, hermetic sealing performance may be improved more than in the other embodiments.

In addition, the inclined surface 126 may be formed only at the projection portion 125, although both the inclined surface 126 of the projection portion 125 and the inclined surface 132 of the potting unit 130 may be formed. In this case, since the hardness of the projection portion 125 is higher than the hardness of the potting unit 130, the inclined surface 126 of the projection portion 125 may press the edge of the potting unit 130 such that the potting unit is deformed to have an inclined surface.

Figure 9:
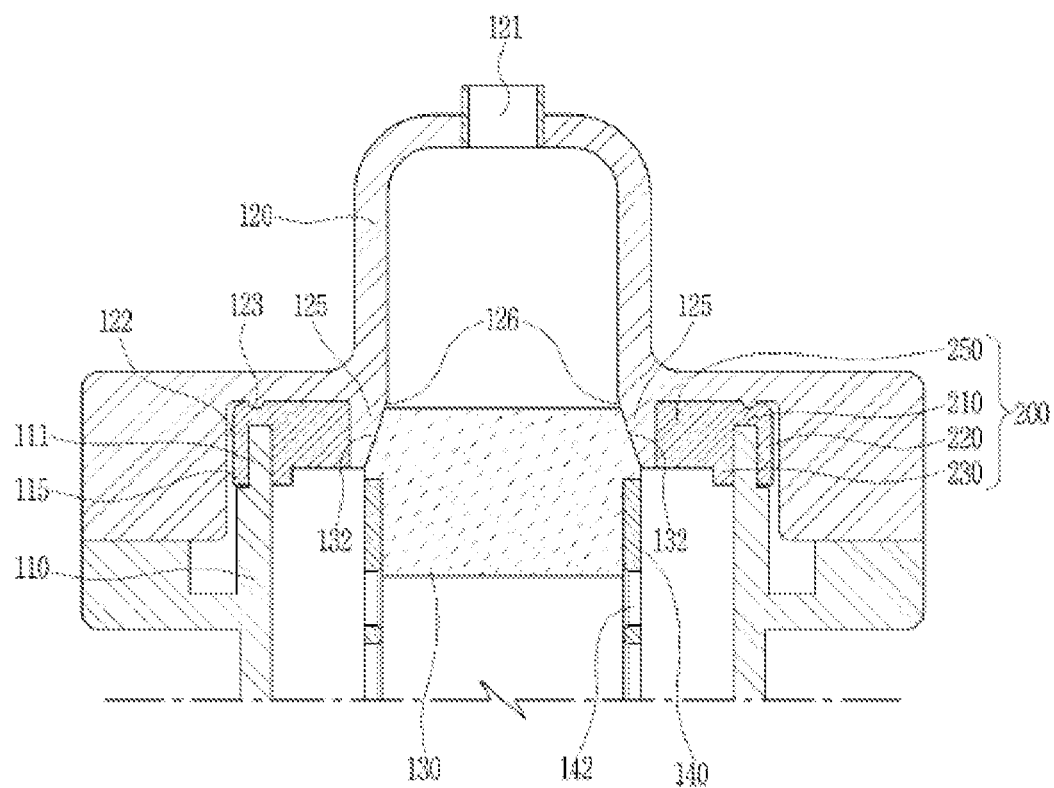
FIG. 9 is a sectional view showing a membrane humidifier according to a fifth embodiment of the present disclosure.

FIG. 9 is a sectional view showing a membrane humidifier according to a fifth embodiment of the present disclosure. The membrane humidifier according to the fifth embodiment is different from the membrane humidifier according to the fourth embodiment in that the assembly member 200 further includes a filling portion 250 filling the area between the projection portion 125 of the cap case 120 and the second leg portion 230.

Since the inner surface of the cap case 120 and the potting unit 130 are disposed so as to be spaced apart from each other, as described above, the filling portion 250 is formed so as to fill the area between the projecting portion 125 of the cap case 120 and the second leg portion 230. Consequently, it is possible to further prevent the second fluid introduced into the space between the inner surface of the cap case 120 and the cartridge 140 from leaking to the fluid introduction and discharge port 121 without passing through the hollow fiber membranes.

The vertical length of the filling portion 250 may be formed so as to be equal to the length of the projecting portion 125, or may be formed so as to be equal to the length of the second leg portion 230, as shown in FIG. 9. Also, in FIG. 9, the length of each of the first leg portion 220 and the second leg portion 230 is formed so as to be greater than the length of the projecting portion 125. The length of each of the first leg portion 220 and the second leg portion 230 may be formed so as to be equal to the length of the projecting portion 125. In this case, the vertical length of the filling portion 250 may be formed so as to be equal to the length of each of the second leg portion 230 and the projecting portion 125.

The assembly member 200 is made of a soft material that has lower hardness than the cap case 120. The width of the filling portion 250 may be formed so as to be slightly greater than the width between the inner surface of the second leg portion 230 and the outer surface of the projecting portion 125 such that the filling portion can be shrunk by pressing at the time of assembly.

Figure 10:
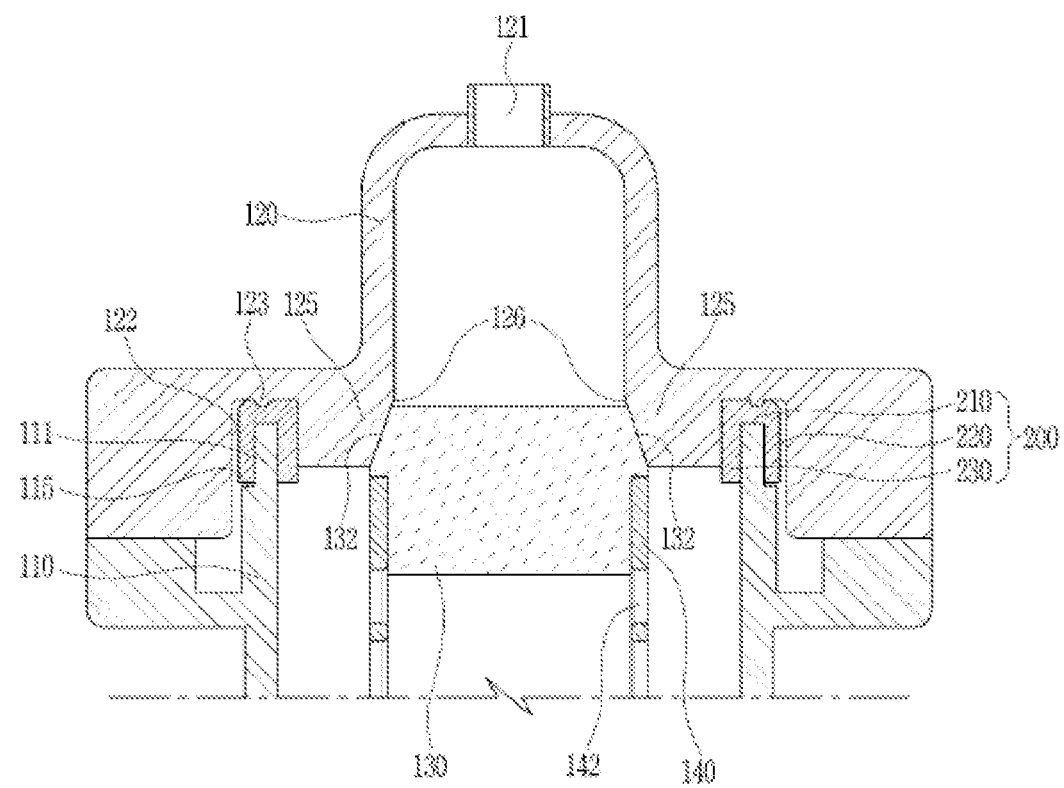
FIG. 10 is a sectional view showing a membrane humidifier according to a sixth embodiment of the present disclosure.

FIG. 10 is a sectional view showing a membrane humidifier according to a sixth embodiment of the present disclosure. The membrane humidifier according to the sixth embodiment is different from the membrane humidifier according to the fourth embodiment in that the projection portion 125 of the cap case 120 is formed so as to be in contact with the second leg portion 230.

In the fourth embodiment, the outer surface of the projection portion 125 is formed so as to have the same plane as the outer surface of the potting unit 130. In the sixth embodiment, however, the projection portion 125 is formed so as to have an increased thickness in the leftward-rightward direction such that the outer surface of the projection portion is in contact with the inner surface of the second leg portion 230 of the assembly member 200.

As a result, the space between the inner surface of the projection portion 125 and the end 111 of the middle case 110 may be completely filled with the projection portion 125 and the assembly member 200. Consequently, it is possible to further prevent the second fluid introduced into the space between the inner surface of the cap case 120 and the cartridge 140 from leaking to the fluid introduction and discharge port 121 without passing through the hollow fiber membranes.

The vertical length of the projection portion 125 is formed so as to be less than the vertical length of the assembly member 200. Alternatively, the projection portion may be formed so as to have the same length as the assembly member 200.

In addition, the membrane humidifier according to each of the fifth embodiment and the sixth embodiment is identical to the membrane humidifier according to the fourth embodiment in that the assembly member 200 includes a main body 210, a first leg portion 220, and a second leg portion 230, the inner side surface of the projection portion 125 is formed as an inclined surface, and the protrusion 123 formed on the inner surface of the cap case 120, i.e. the surface of the cap case that is opposite the end 111 of the middle case 110, so as to protrude therefrom presses the main body 210.

Although embodiments of the present disclosure have been described above, it will be apparent to a person having ordinary skill in the art to which the present disclosure pertains that the present disclosure can be variously modified and altered through addition, change, deletion, or supplement of components without departing from the idea of the present disclosure recited in the following claims and that such modifications and alterations fall within the scope of right of the present disclosure.

INDUSTRIAL APPLICABILITY

A membrane humidifier for a fuel cell including an assembly member according to each of various embodiments of the present disclosure is capable of performing a hermetic sealing function in high-temperature/high-pressure/high-humidity environments through a mechanical assembly structure.

In addition, a mechanical sealing method is used instead of a chemical sealing method, whereby it is possible to omit a polyurethane/sealant coating and curing process necessary in a conventional chemical sealing method, and therefore it is possible to shorten working time, to improve work efficiency, and to construct a mass production system.

In addition, when unit cartridges disposed in the membrane humidifier are defective, reworkability is excellent, whereby it is possible to reduce a part scrap rate.

In addition, the membrane humidifier may be disassembled, only defective cartridges may be replaced, and then the membrane humidifier may be reassembled, whereby the present disclosure is advantageous in terms of reworkability and reuse of parts.

Furthermore, it is possible to simultaneously perform hermetic coupling between two or more parts through assembly members and projecting portions of cap cases, whereby manufacture and assembly are very convenient and efficient.

The invention claimed is:

1. A membrane humidifier for a fuel cell, the membrane humidifier comprising:
   a middle case accommodating a plurality of hollow fiber membranes;
   a cap case coupled to the middle case;
   a potting unit formed at ends of the plurality of hollow fiber membranes;
   an assembly member disposed between the cap case and an end of the middle case, the assembly member being configured to perform hermetic coupling therebetween; and
   a projection portion extending from an inside of the cap case toward an edge of the potting unit, the projection portion being configured to perform hermetic coupling between the cap case and the potting unit,
   wherein the assembly member comprises:
   a main body disposed between the cap case and the end of the middle case;
   a first leg portion extending from an outer end of the main body in a longitudinal direction of the hollow fiber membranes so as to be in contact with an outer side surface of the end of the middle case; and
   a second leg portion extending from an inner end of the main body in the longitudinal direction of the hollow fiber membranes so as to be in contact with an inner side surface of the end of the middle case,
   wherein the projection portion comprises an inclined surface formed at an inner side surface thereof, and
   wherein the potting unit comprises an inclined surface formed at an outer side surface thereof so as to press against the inclined surface of the projection portion.

2. The membrane humidifier according to claim 1, wherein the projection portion of the cap case is formed so as to be in contact with the second leg portion.

3. The membrane humidifier according to claim 1, wherein the outer side surface of the end of the middle case is provided with a step portion configured to receive the first leg portion.

4. The membrane humidifier according to claim 3, wherein the cap case comprises a protrusion protruding from a surface thereof opposite the end of the middle case.

5. The membrane humidifier according to claim 2, wherein the outer side surface of the end of the middle case is provided with a step portion configured to receive the first leg portion.

6. The membrane humidifier according to claim 5, wherein the cap case comprises a protrusion protruding from a surface thereof opposite the end of the middle case.

* * * * *